United States Patent
Hiramatsu et al.

(10) Patent No.: US 7,101,087 B2
(45) Date of Patent: Sep. 5, 2006

(54) SLIDING MEMBER

(75) Inventors: Nobutaka Hiramatsu, Inuyama (JP);
Takuya Tanaka, Inuyama (JP);
Hideyuki Nakajima, Inuyama (JP);
Masahito Fujita, Inuyama (JP);
Takayuki Shibayama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 357 days.

(21) Appl. No.: 10/421,329

(22) Filed: Apr. 23, 2003

(65) Prior Publication Data

US 2003/0235355 A1 Dec. 25, 2003

(30) Foreign Application Priority Data

Jun. 14, 2002 (JP) .............................. 2002-174279

(51) Int. Cl.
*F16C 33/20* (2006.01)

(52) U.S. Cl. .................. 384/279; 384/276; 384/902

(58) Field of Classification Search ................ 384/276, 384/279, 902

See application file for complete search history.

(56) References Cited

U.S. PATENT DOCUMENTS

| 3,652,408 | A | * | 3/1972 | Korshak et al. | ............. 508/128 |
| 4,767,677 | A | * | 8/1988 | Kuwayama | ................. 428/551 |
| 5,384,352 | A | * | 1/1995 | Andres et al. | ............... 524/404 |
| 2003/0235355 | A1 | * | 12/2003 | Hiramatsu et al. | ............ 384/276 |
| 2004/0008914 | A1 | * | 1/2004 | Hiramatsu et al. | ............ 384/276 |
| 2005/0004258 | A1 | * | 1/2005 | Yamamoto et al. | ............ 523/149 |

FOREIGN PATENT DOCUMENTS

| JP | A-4-83914 | 2/1992 |
| JP | A-8-59991 | 3/1996 |
| JP | A-9-79262 | 3/1997 |

* cited by examiner

*Primary Examiner*—William C. Joyce
(74) *Attorney, Agent, or Firm*—Rader, Fishman & Grauer PLLC

(57) ABSTRACT

A sliding member includes a substrate, a porous layer provided on the surface of the substrate and a sliding layer with which the porous layer is impregnated and coated. The sliding layer contains polybenzimidazole, 1–70 vol % of a solid lubricant and 0.1–10 vol % of hard particles.

2 Claims, 1 Drawing Sheet

SLIDING MEMBER

CROSS-REFERENCE TO RELATED APPLICATIONS

This application claims priority based on Japanese Application No. 2002-174279, filed Jun. 14, 2002.

BACKGROUND OF THE INVENTION

The present invention relates to a sliding member having a sliding layer on a sliding surface.

Sliding members, for example, plain bearings for engines of automobiles are usually improved in wear resistance, anti-seizure property and initial conformability by providing a sliding layer comprising a thermosetting resin such as a polyamide-imide (hereinafter referred to as "PAI") resin, a polyimide (hereinafter referred to as "PI") resin or an epoxy (hereinafter referred to as "EP") resin containing a solid lubricant or the like on the surface of a substrate comprising a back metal made of a steel plate and a bearing alloy layer provided on the back metal (see, for example, JP-A-4-83914 and JP-A-9-79262).

Furthermore, JP-A-8-59991 discloses resin-based sliding materials comprising PAI and PI as base resins which contain solid lubricants and hard particles.

However, the above-mentioned conventional sliding materials are all insufficient in wear resistance.

SUMMARY OF THE INVENTION

The object of the present invention is to provide a sliding member having a sliding layer provided on a sliding surface which is further improved in sliding characteristics, particularly, wear resistance, and, besides, in bonding force of the sliding layer.

In the present invention for attaining the above object, the sliding member comprises a substrate, a porous layer provided on the surface of the substrate and a sliding layer with which the porous layer is impregnated and coated, said sliding layer containing polybenzimidazole (hereinafter referred to as "PBI") and 1–70 vol % of a solid lubricant.

TABLE 1

|  | PBI resin (Polybenzimidazole) | PI resin |
|---|---|---|
| Tensile strength (MPa) | 127 | 90~120 |
| Elongation (%) | 30 | 8~23 |
| Heat distortion temperature (° C.) | 427 | 272 |

The above Table 1 shows physical properties of the PBI resin which is a base resin of the sliding layer. The PBI resin which is a thermoplastic resin is superior in heat resistance to the conventionally used thermosetting resins (PAI, PI and EP resins) and, furthermore, is high in material strength. Therefore, wear resistance and anti-seizure property of the sliding member can be improved by using the PBI resin. Furthermore, since decrease of material strength in a high-temperature atmosphere and decrease of material strength caused by heat generated during the sliding operation are small, satisfactory wear resistance can be maintained even during the sliding at high temperatures. Moreover, the PBI resin has extensibility and, hence, initial conformability can be improved by using the PBI resin.

Furthermore, the sliding layer contains a solid lubricant, which can also reduce the coefficient of friction and improve anti-seizure property. In this case, if the content of the solid lubricant is less than 1 vol %, the effect to improve lubricity can hardly be obtained, and if it exceeds 70 vol %, the wear resistance is deteriorated. Therefore, the content of the solid lubricant is preferably 1–70 vol %.

Moreover, since the sliding layer is provided in such a manner that the porous layer provided on the surface of the substrate is impregnated and coated with the sliding layer, a part of the sliding layer enters into the pores of the porous layer, and, hence, due to the anchoring effect, the sliding layer is firmly bonded to the substrate and it hardly peels off.

As the substrate, there may be used carbon steel, stainless steel, copper or copper alloys, aluminum or aluminum alloys, etc. As the porous layer, there may be used metals such as copper or copper alloys, aluminum or aluminum alloys, nickel or nickel alloys, tin or tin alloys, etc.

As the solid lubricant, it is preferred to use at least one of polytetrafluoroethylene (hereinafter referred to as "PTFE"), graphite and molybdenum disulfide.

It is preferred that the sliding layer contains 0.1–10 vol % of hard particles.

The hard particles contribute to the improvement of wear resistance. Therefore, the wear resistance can be further improved by adding the hard particles to the sliding layer. As the hard particles, there may be used, for example, titanium oxide, alumina, silicon nitride, tin oxide and boron nitride. In this case, if the content of the hard particles is less than 0.1 vol %, the effect to improve wear resistance by the, hard particles cannot be obtained, and if it exceeds 10 vol %, coefficient of friction increases, and, as a result, mating members are apt to be damaged and additionally anti-seizure property is deteriorated. Therefore, the content of the hard particles is preferably 0.1–10 vol %.

It is preferred that the sliding layer contains 0.1–15 vol % of an oil.

Since the oil contributes to the improvement of lubricity, coefficient of friction can be reduced and anti-seizure property can be improved by adding the oil to the sliding layer. In this case, if the content of the oil is less than 0.1 vol %, the effect to improve lubricity by the oil cannot be obtained, and if it exceeds 15 vol %, wear resistance is deteriorated. Therefore, the content of the oil is preferably 0.1–15 vol %. Examples of the oil are mineral oil, synthetic oil, etc.

Figure 1:
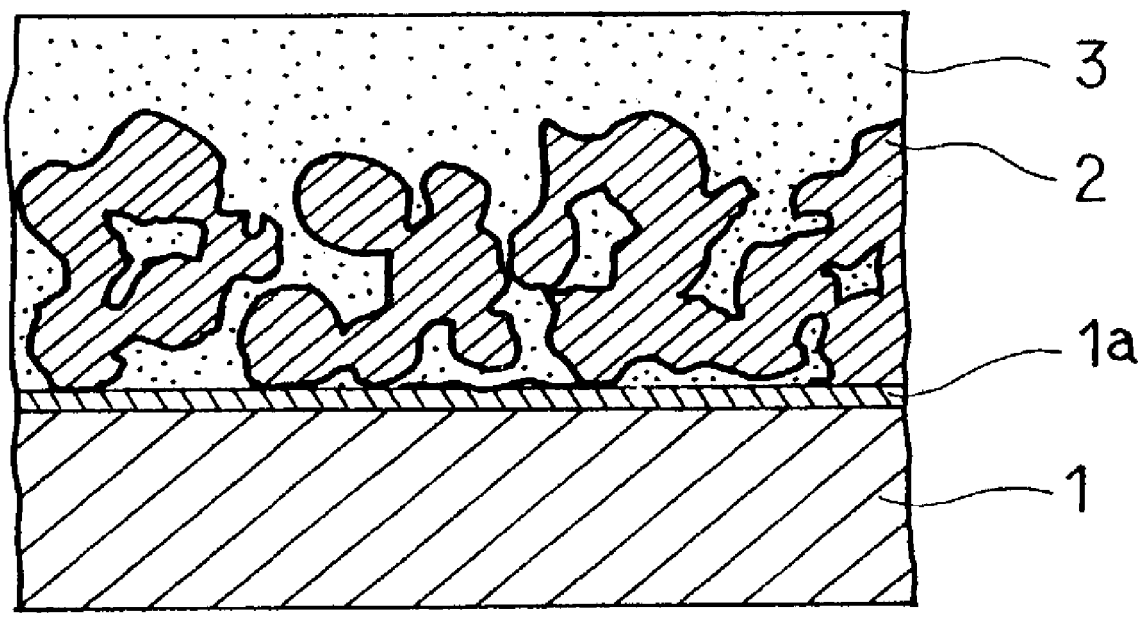
FIG. 1 is a sectional view of a sliding member of an embodiment according to the present invention.

In the drawing, 1 indicates a substrate, 2 indicates a porous layer and 3 indicates a sliding layer.

DETAILED DESCRIPTION OF THE INVENTION

The embodiments of the present invention will be explained below.

FIG. 1 is a sectional view of a sliding member which schematically illustrates an embodiment of the present invention. The sliding member is produced in the following manner. A plating layer 1a comprising copper or the like is provided on the surface of a substrate 1 comprising stainless steel or carbon steel, and a porous layer 2 is provided by spreading metal powders of a copper alloy or the like on the surface of the plating layer 1a and sintering the metal powders. Then, the porous layer 2 is impregnated with a sliding layer composition (namely, a mixture of PBI which is a base resin, a solid lubricant such as molybdenum disulfide and, if necessary, hard particles and oil) diluted with a suitable organic solvent, thereby allowing the composition to enter into the pores and coating the porous layer 2 with the composition, followed by heating to cure the composition. Thus, the sliding layer composition containing the PBI and the solid lubricant is cured, whereby a sliding layer 3 is provided on the surface of the porous layer 2. In this case, the thickness of the sliding layer 3 is usually 1–200 μm, preferably 10–100 μm.

It is also possible to produce a plain bearing by carrying out working into the shape of a plain bearing after providing the sliding layer 3 on the substrate 1.

without providing the porous layer which was provided in Examples 1–18.

A frictional wear test and a bonding test were conducted on the samples of Examples 1–18 of the present invention and those of Comparative Examples 1–7, and the results are shown in Tables 2 and 3. The frictional wear test was conducted under the test conditions shown in Table 4 using a thrust type frictional wear tester, and coefficient of friction and an amount of wear were measured.

TABLE 2

| Example No. | Composition of sliding layer (vol %) | | | | | | | | | | | Test results | | |
|---|---|---|---|---|---|---|---|---|---|---|---|---|---|---|
| | Base resin | | | Solid lubricant | | | Hard particles | | | | | Coefficient of friction | Amount of wear (μm) | Bonding force (N/mm²) |
| | PBI | EP | PAI | MoS₂ | Gr | PTFE | TiO₂ | Al₂O₃ | Si₃N₄ | SnO₂ | Oil | | | |
| 1 | Remainder | | | 1 | | | | | | | | 0.10 | 3 | 26.5 |
| 2 | Remainder | | | 20 | | | | | | | | 0.07 | 5 | 21.2 |
| 3 | Remainder | | | 40 | | | | | | | | 0.05 | 8 | 15.8 |
| 4 | Remainder | | | 60 | | | | | | | | 0.03 | 8 | 12.1 |
| 5 | Remainder | | | 70 | | | | | | | | 0.03 | 9 | 10.0 |
| 6 | Remainder | | | | 40 | | | | | | | 0.04 | 7 | 15.5 |
| 7 | Remainder | | | | | 20 | | | | | | 0.05 | 6 | 19.8 |
| 8 | Remainder | | | | | 40 | | | | | | 0.03 | 9 | 14.1 |
| 9 | Remainder | | | 40 | | | | 1 | | | | 0.07 | 4 | 15.5 |
| 10 | Remainder | | | 40 | | | | 5 | | | | 0.07 | 2 | 15.0 |
| 11 | Remainder | | | 40 | | | | 10 | | | | 0.09 | 4 | 14.1 |
| 12 | Remainder | | | 40 | | | | | 3 | | | 0.04 | 1 | 15.2 |
| 13 | Remainder | | | 40 | | | | 3 | | | | 0.05 | 2 | 15.5 |
| 14 | Remainder | | | 40 | | | 3 | | | | | 0.04 | 1 | 15.1 |
| 15 | Remainder | | | 40 | | | | | | 3 | 1 | 0.02 | 1 | 15.1 |
| 16 | Remainder | | | 40 | | | | | | 3 | 5 | 0.01 | 3 | 14.5 |
| 17 | Remainder | | | 40 | | | | | | 3 | 10 | 0.01 | 4 | 13.0 |
| 18 | Remainder | | | 40 | | | | | | 3 | 15 | 0.01 | 8 | 11.8 |

TABLE 3

| Comparative Example No. | Composition of sliding layer (vol %) | | | | | | | | | | | Test results | | |
|---|---|---|---|---|---|---|---|---|---|---|---|---|---|---|
| | Base resin | | | Solid lubricant | | | Hard particles | | | | | Coefficient of friction | Amount of wear (μm) | Bonding force (N/mm²) |
| | PBI | EP | PAI | MoS₂ | Gr | PTFE | TiO₂ | Al₂O₃ | Si₃N₄ | SnO₂ | Oil | | | |
| 1 | | | Remainder | 40 | | | | | | | | 0.05 | 17 | 10.1 |
| 2 | | | Remainder | | 40 | | | | | | | 0.06 | 17 | 10.0 |
| 3 | | | Remainder | | | 40 | | | | | | 0.04 | 15 | 8.9 |
| 4 | | | Remainder | 40 | | | | | 3 | | | 0.05 | 11 | 9.2 |
| 5 | | | Remainder | 40 | | | | 3 | | | | 0.06 | 11 | 9.1 |
| 6 | | Remainder | | 40 | | | | | | | | 0.07 | 19 | 8.6 |
| 7 | | Remainder | | | | 40 | | | | | | 0.07 | 18 | 8.1 |

Table 2 shows compositions of the sliding layer in the samples obtained as mentioned above in Examples 1–18 of the present invention. In Table 2, the base resin in the composition of the sliding layer was all PBI. The contents of the components in the sliding layer were 1–70 vol % of the solid lubricant, 1–10 vol % of the hard particles and 1–15 vol % of the oil. Molybdenum disulfide (MoS2), graphite (Gr) or PTFE was used as the solid lubricant, titanium oxide (TiO2), alumina (Al2O3), silicon nitride (Si3N4) or tin oxide (SnO2) was used as the hard particles, and an Si-based synthetic oil was used as the oil.

Table 3 shows compositions of the sliding layer of the samples of:

Comparative Examples 1–7 in comparison with Examples 1–18 of the present invention. In Table 3, the base resin of the sliding layer was PAI or EP.

Furthermore, in Comparative Examples 1–7, the sliding layer was directly provided on the surface of the substrate

TABLE 4

| Frictional wear test conditions | |
|---|---|
| Items | Test conditions |
| Surface pressure | 10 MPa |
| Peripheral speed | 0.5 m/s |
| Testing time | 4 Hrs |
| Method of lubrication | Oil bath |

The bonding test was conducted in the following manner. First, a test piece of 20 mm×50 mm was prepared, and the test piece and a columnar iron rod (8–10 mm in diameter) were bonded with an epoxy adhesive, followed by curing. After curing, the adhesive which squeezed out of the bonded portion was trimmed, and, then, tensile test was carried out at 5 mm/min. The value obtained was divided by a sectional area of the columnar iron rod to obtain a bonding force.

The examples and the comparative examples are compared. First, Examples 3 is compared with Comparative Examples 1 and 6. These example and comparative examples were the same in the solid lubricant ($MoS_2$) and the content thereof (40 vol %) in the sliding layer. It can be seen from the test results that the coefficient of friction was nearly the same, but the amount of wear was 17 μm and 19 μm in Comparative Examples 1 and 6 while it was 8 μm in Examples 3, and thus the sample of Example 3 was superior in wear resistance. With respect to the bonding force, it was 10.1 $N/mm^2$ and 8.6 $N/mm^2$ in Comparative Examples 1 and 6 while it was 15.8 $N/mm^2$ in Examples 3. Thus, it can be seen that the bonding force of the sliding layer was greater in Example 3 than in Comparative Examples 1 and 6, and the bonding force of the sliding layer in Example 3 was superior to that in Comparative Examples 1 and 6 and the sliding layer in Example 3 hardly peeled off.

Example 6 is compared with Comparative Examples 2 and 7. These example and comparative examples were also the same in the solid lubricant (Gr) and the content thereof (40 vol %) in the sliding layer. It can be seen from the test results that the coefficient of friction was nearly the same, but the amount of wear was less in Example 6, and thus the sample of Examples 6 was superior in wear resistance to those of Comparative Examples 2 and 7. Regarding the bonding force, it was larger in Example 6 and superior to that of Comparative Examples 2 and 7.

Example 8 is compared with Comparative Example 3. These were also the same in the solid lubricant (PTFE) and the content thereof (40 vol %) in the sliding layer. It can be seen from the test results that the coefficient of friction was nearly the same, but the amount of wear was less in Example 8, and thus the sample of Example 8 was also superior in wear resistance to that of Comparative Example 3. Regarding the bonding force, it was larger in Example 8 and superior to that of Comparative Example 3.

Example 12 is compared with Comparative Example 4. These example and comparative example were the same in the solid lubricant and the hard particles ($MoS_2$ and $Si_3N_4$) and the contents thereof (40 vol % and 3 vol %) in the sliding layer. It can be seen from the test results that the coefficient of friction was nearly the same, but the amount of wear was less in Example 12, and thus the sample of Example 12 was also superior in wear resistance to that of Comparative Example 4. Regarding the bonding force, it was larger in Example 12 and superior to that of Comparative Example 4.

Example 14 is compared with Comparative Example 5. These were also the same in the solid lubricant and the hard particles ($MoS_2$ and $TiO_2$) and the contents thereof (40 vol % and 3 vol %) in the sliding layer. It can be seen from the test results that the coefficient of friction was nearly the same, but the amount of wear was less in Example 14, and thus the sample of Example 14 was superior in wear resistance to that of Comparative Example 5. Regarding the bonding force, it was larger in Example 14 and superior to that of Comparative Example 5.

Examples 1–5 are examined. These were the same in the solid lubricant, but different in the content thereof. In Example 1 where the content of the solid lubricant was 1 vol %, the coefficient of friction was higher than in other examples, and it is presumed that if the content is less than 1 vol %, the effect to improve the lubricity by the solid lubricant can hardly be obtained. Furthermore, in Example 5 where the content of the solid lubricant was 70 vol %, the amount of wear was larger and the bonding force was smaller than in other examples, and it is presumed that if the content exceeds 70 vol %, the amount of wear further increases, and simultaneously the bonding force further decreases. Therefore, the content of the solid lubricant is preferably 1–70 vol %.

Example 3 and Examples 9–14 are examined. The hard particles were not added to the sliding layer in Example 3 while the hard particles were added to the sliding layer in Examples 9–14. The amount of wear in Example 3 where the hard particles were not added was 8 μm while the amount of wear in Example 9–14 where the hard particles were added was 1–4 μm. Thus, it can be seen that the samples in which the hard particles were added were superior in wear resistance.

Moreover, among the samples of Examples 9–14, the sample of Example 11 where the content of the hard particles was 10 vol % was higher in coefficient of friction than the samples of other examples. When the content of the hard particles was smaller, the effect to improve wear resistance by the hard particles could not be obtained. Therefore, the content of the hard particles in the sliding layer is preferably 0.1–10 vol %.

Examples 12–14 and Examples 15–18 are examined. In Examples 12–14, the hard particles were added to the sliding layer, but oil was not added. On the other hand, in Examples 15–18, the hard particles and the oil were added to the sliding layer. In Examples 15–18 where the hard particles and the oil were added to the sliding layer, the coefficient of friction was low, namely, not higher than 0.02, and it can be seen that the frictional wear characteristic was particularly excellent.

Furthermore, among Examples 15–18, in Example 18 where the content of the oil was 15 vol %, the amount of wear was greater than in other examples, and the bonding force decreased. Further, when the content of oil was low, the effect to improve the lubricity by the oil could not be obtained. Therefore, the content of oil in the sliding layer is preferably 0.1–15 vol %.

The present invention can be applied not only to bushes of compressors, wiper arms, shock absorbers and others, but also to plain bearings for engines of automobiles, sliding members for vibration dampers, air springs of railway vehicles, etc.

In the above embodiments, the present invention has been explained when the sliding members are used under hydrodynamic lubrication as shown in Table 4, but they can also be used under boundary lubrication or under no lubrication.

What is claimed is:

1. A sliding member comprising a substrate, a porous layer provided on the surface of the substrate and a sliding layer with which the porous layer is impregnated and coated, said sliding layer containing polybenzimidazole, 1–70 vol % of a solid lubricant and 0.1–10 vol % of hard particles, wherein the sliding layer contains 0.1–15 vol % of an oil.

2. A sliding member comprising a substrate, a porous layer provided on the surface of the substrate and a sliding layer with which the porous layer is impregnated and coated, said sliding layer containing polybenzimidazole and 1–70 vol % of a solid lubricant, wherein the solid lubricant comprises at least one of polytetrafluoroethylene, graphite and molybdenum disulfide, wherein the sliding layer contains 0.1–10 vol % of hard particles, and wherein the slidinci layer contains 0.1–15 vol % of an oil.

* * * * *